United States Patent
Fritsch et al.

(10) Patent No.: US 7,658,784 B2
(45) Date of Patent: Feb. 9, 2010

(54) COMPOSITE MATERIAL, IN PARTICULAR COMPOSITE MEMBRANE, AND PROCESS FOR THE PRODUCTION OF THE SAME

(75) Inventors: Detlev Fritsch, Reinbek (DE); Klaus-Viktor Peinemann, Geesthacht (DE); Dominique De Figueiredo Gomes, Harsefeld (DE)

(73) Assignee: GKSS-Forschungszentrum Geesthacht, Geesthacht (DE)

( * ) Notice: Subject to any disclaimer, the term of this patent is extended or adjusted under 35 U.S.C. 154(b) by 559 days.

(21) Appl. No.: 11/400,821

(22) Filed: Apr. 7, 2006

(65) Prior Publication Data

US 2006/0230926 A1 Oct. 19, 2006

(30) Foreign Application Priority Data

Apr. 13, 2005 (DE) .................. 10 2005 017 195

(51) Int. Cl.
*B01D 53/22* (2006.01)
(52) U.S. Cl. .................. 95/45; 95/50; 96/4; 96/11; 96/12; 96/13; 96/14; 210/500.27; 210/645; 210/640
(58) Field of Classification Search .............. 95/45, 95/50; 96/4, 11–14; 210/500.27, 645, 640
See application file for complete search history.

(56) References Cited

U.S. PATENT DOCUMENTS

| | | | |
|---|---|---|---|
| 4,504,684 A | 3/1985 | Fox et al. ............... 568/454 |
| 4,584,359 A | 4/1986 | Sterzel et al. ........... 526/241 |
| 4,740,219 A | 4/1988 | Kulprathipanja et al. ..... 55/16 |
| 4,828,941 A | 5/1989 | Sterzel .................. 429/33 |
| 4,912,197 A | 3/1990 | Hayes .................. 528/353 |
| 4,981,561 A | 1/1991 | Babinee et al. .......... 204/81 |
| 5,127,925 A | 7/1992 | Kulprathipanja et al. ..... 55/16 |
| 5,176,724 A * | 1/1993 | Saito et al. ............. 96/13 |
| 6,471,745 B1 * | 10/2002 | Foley et al. ............ 95/54 |
| 6,585,802 B2 | 7/2003 | Koros et al. ............ 95/51 |
| 6,624,318 B1 | 9/2003 | Muller et al. .......... 549/529 |
| 6,755,900 B2 * | 6/2004 | Koros et al. ............ 96/10 |
| 6,767,384 B1 * | 7/2004 | Vu et al. ............... 95/45 |
| 6,929,679 B2 | 8/2005 | Muller et al. ........... 95/90 |
| 2005/0173345 A1 * | 8/2005 | Minhas et al. .......... 210/650 |

OTHER PUBLICATIONS

Coordination Polymers, Wikipedia.*
Dybtsev, et al., "Rigid and Flexible: A Highly Porous Metal-Organic Framework with Unusual Guest-Dependent Dynamic Behavior," Andew. Chem. 2004, 116, pp. 5143-5146.
Vu, et al., "Mixed Matrix Membranes Using Carbon Molecular Sieves I. Preparation and Experimental Results," Journal of Membrane Science 211 (2003) pp. 311-334.
Kitagawa, et al., "Functional Porous Coordination Polymers," Angew. Chem. Int. Ed. 2004, 43, pp. 2334-2375.
English translation of German Office Action dated Aug. 9, 2006.
Foreign Search Report dated Jul. 28, 2006.

* cited by examiner

*Primary Examiner*—Jason M Greene
*Assistant Examiner*—Dung Bui
(74) *Attorney, Agent, or Firm*—Thomas, Kayden, Horstemeyer & Risley, LLP (57) ABSTRACT

Composite materials are provided. A representative material is configured as a composite membrane for gas separation, vapor separation, or pervaporation. The composite membrane comprises at least a first polymer and a second polymer. Processes for the production of composite materials, in particular composite membranes, also are provided.

19 Claims, 4 Drawing Sheets

$$R-OH + R'_3-Si-X \xrightarrow{-R'-H} R-O-\underset{\underset{R'}{|}}{\overset{\overset{R'}{|}}{Si}}-X$$

COMPOSITE MATERIAL, IN PARTICULAR COMPOSITE MEMBRANE, AND PROCESS FOR THE PRODUCTION OF THE SAME

CROSS-REFERENCE TO RELATED APPLICATIONS

The present application claims priority under 35 U.S.C. §119 of German Patent Application No. 10 2005 017 195.8-44, filed on Apr. 13, 2005, the disclosure of which is expressly incorporated by reference herein in its entirety.

BACKGROUND

The invention relates to a composite material, in particular a composite membrane, in particular for gas separation, vapor separation, or pervaporation, comprising at least one polymer and a second polymer. The invention relates furthermore to a process for the production of a composite material, in particular a composite membrane.

Polymer membranes used commercially for gas separation are, as a rule, composite membranes which consist of a porous substructure and a pore-free, dense polymer film. In these, a composite material is used or the composite membrane comprises a corresponding composite material. For commercial utility it is essential to achieve high gas flows per unit area in order to keep the membrane surfaces and the energy costs low. The properties of the polymer predetermine the selectivity and the gas flow which are possible.

The flow decreases in proportion to increasing layer thickness while the selectivity remains essentially constant. It is therefore important to find suitable materials and process them into composite membranes, or integral asymmetric membranes, with the smallest possible layer thicknesses.

The available polymeric materials can be divided roughly into elastomers and vitreous polymers, which are distinguished by the position of their glass transition temperature above or below room temperature. Both types of polymer come into consideration for gas separation. Optimized membranes used commercially have, as a rule, separation-active layers with layer thicknesses of 0.5 to 1 μm.

It was possible to achieve an improvement of the separation properties of polymers known per se through the addition of porous materials. Through the addition of solids to the polymer a material arises with a mixed matrix of inorganic/organic components. Membranes produced according to this principle are known as "mixed matrix membranes" (see Koros, et al. U.S. Pat. No. 6,585,802, which is incorporated by reference herein). It was possible to improve the permeability as well as selectivity, in the ideal case even permeability and selectivity. Here the grain size of the porous structures used must be significantly less than the layer thickness desired in order to obtain dense films with embedded porous solids.

As porous solids to incorporate into the polymeric matrix, zeolites (molecular sieves), aluminum oxides, (boehmite, γ-aluminum oxide), silicon oxides, fullerenes (see Polotskaya et al., Fuller. Nanotub. Carbon Nanostruct. 12 (2004) 371-376, which is incorporated by reference herein) or carbon molecular sieves (see Vu et al., J. Membrane Sci. 211 (2003) 311-334, which is incorporated by reference herein) have already been investigated. Generally, the compatibility of the two components, polymer and porous filler, is very important. With incompatible materials (solid and polymer) flaws arise at the contact points, said flaws reducing the gas selectivity and thus making use in commercial application impossible. In general, elastomers can be processed to form flawless membranes more effectively than vitreous polymers.

Previously, zeolites (molecular sieves) above all were incorporated in elastomer membranes of polydimethylsiloxane (see D. Paul et al., J. Polymer Sci., 41 (1973) 79; M. Jia et al., J. Membrane Sci., 57 (1991) 289, which are incorporated by reference herein), where using zeolites Type 5A (Paul et al.) no improvement of the membrane properties was achieved. With zeolite Type ZSM-5 (Jia et al.) an increase of the permeability as well as of the selectivity was found. Zeolite ZSM-5 also yielded improved membranes on incorporation in cellulose acetate membranes (see Kulprathipanja et al. (U.S. Pat. Nos. 4,740,219 and 5,217,925), which is incorporated by reference herein). In other vitreous polymers, which are distinguished by particularly attractive gas selectivity, no clear increase of selectivity was found through a special treatment of the zeolites for the improvement of compatibility (see Gur, J. Membrane Sci. 93 (1994) 283; Duval et al., J. Membrane Sci. 80 (1993) 189, and J. Appl. Polymer Sci. 54 (1994) 409, which are incorporated by reference herein). Through the addition of softeners solid/polymer compatibility can be improved (see Mahajan, et al., J. Appl. Polym. Sci. 86 (2002) 881-890, which is incorporated by reference herein).

The addition of softeners does in fact improve the flawless incorporation of inorganic solids but the softener can, despite its low vapor pressure, bleed and volatize during the intensive rinsing with gas in the application of the membrane. Thereby the positive effect of the softener is gradually lost along with the improved gas separation properties. Thus it would not be possible to produce a membrane which is stable long-term.

Particularly important is the absolute freedom from flaws in the form of penetrating mesopores and macropores which allow a partial flow of the gas to occur without a separation effect. Even with a few flaws this partial flow reduces the selectivity considerably below the value which is required for implementation in commercial applications. The previously used, above-described classes of material have in common the fact that they are well compatible with only a few polymeric materials, for example, with the elastomer polydimethylsiloxane which however also has only a low selectivity with respect to $O_2/N_2$ or $CO_2/CH_4$. Vitreous polymers with usually good selectivities with respect to these gas pairs are not, as a rule, compatible with these inorganic, porous substances and also cannot necessarily be adapted to one another on the molecular level with auxiliary agents (see Mahajan, et al., Polym. Eng. Sci. 42 (2002) 1420-1431 and ibid. 1432-1441, which is incorporated by reference herein).

SUMMARY

It is the objective of the present invention to specify an alternative composite material, or an alternative composite membrane, as well as a process for the production of the same by means of which high permeability and selectivity are made possible.

This objective is realized by a composite material, in particular a composite membrane, in particular for gas separation or pervaporation, comprising at least a first polymer and a second polymer which is enhanced by the fact that the second polymer is a coordination polymer.

Through the addition of economical coordination polymers to polymers otherwise customary for the production of membranes, composite material with new properties can be produced. These properties make possible high permeability and also high selectivity in the composite material or a membrane produced therefrom. If a coordination polymer which is a metal organic framework with permanent porosity is added to the first polymer, the gas permeability of the composite material, or a corresponding composite membrane, can be increased in comparison to customary membranes with the same thickness. This is due to a relatively large, accessible volume in the interior of the composite material due to the porosity of the metal organic framework (which is called MOF in the following).

Preferably, the coordination polymer is in crystal form, in particular in the form of crystal clusters. The crystal clusters preferably have an extension of approximately 0.1 μM to 50 μm and particularly preferably from 0.4 μm to 10 μm. With a composite membrane the extension is preferably in the range from 0.1 μm to 1 μm, particularly preferably of 0.5 μm. Preferably, the coordination polymer is catalytically active. With the use of an appropriate sorption-selective framework the selectivity can be appropriately increased. Use as a membrane for gas and vapor separation or pressure-swing adsorption can be provided. In corresponding coordination polymers or metal organic frameworks polymers which comprise main chains built up from many low-molecular ligands, said main chains are held together by metal complexes and thus by coordinative or ionic bonds. The removal of the metal centers in coordination polymers is customarily associated with the breakdown of the polymer chains into low-molecular products.

Preferably, the first polymer is formed as a polymer matrix. The polymer matrix is then, for example, formed around the second polymer in the form of the coordination polymer and to that extent holds the composite material structure together. The second polymer is to that extent a type of filler for the composite material or the composite membrane. Preferably, the first polymer is a material from which a dense membrane can be produced. In a dense membrane there is material transport through the membrane in the form of diffusion and sorption and not in the form of convection.

Preferably, the coordination polymer has an elementary cell size in the range of 0.3 to 10 nm, in particular 0.5 to 1 nm.

In particularly preferred embodiment examples intercalates are introduced in the cavities. The intercalates are preferably Cr, Mu, Fe, Co, Ni, Cu, Mo, Ru, Rk, Pd, Ag, In, Sn, W, Re, Os, Ir, Pt, Au, Pb, Ce, and/or La. The intercalates can thus be catalytically reactive intercalates or substances such as, for example, palladium, zinc, or platinum. Through intercalation of materials of this type the catalytic properties of the metal organic framework can be retained so that they can be applied with the properties of the membrane to selective material transport in a membrane reactor.

Preferably, the surface of the coordination polymer is modified to be more non-polar or more polar. Through this preferred development of the composite material the compatibility of the coordination polymer relative to the first polymer is routinely improved. Here, a previously polar surface can be modified to be at least partially or completely non-polar.

In a particularly preferred embodiment of the invention a gas selectivity of more than 13, in particular more than 16, can be provided as the ratio of n-butane to methane or of $CO_2$ to $CH_4$.

Preferably, one provides a composite membrane comprising a thin layer, in particular with a thickness of 0.3 μm to 2 μm, in particular in the range of 0.5 μm to 1 μm, said thin layer being applied on a porous base.

Furthermore, the objective is realized by a process for the production of a composite material, in particular of a composite membrane, which in particular is described above, where a coordination polymer is mixed in an, in particular liquid, first polymer or a first polymer brought into solution. Preferably, the coordination polymer, which in particular is present in the form of crystals, is comminuted.

A, in particular thin, film is preferably formed. To form the film the material is expediently applied on a base which is preferably porous and a solvent, which is provided in the material for mixing the materials, is evaporated off. This preferably occurs under a protective gas atmosphere. It is particularly preferred if the film is subsequently put into a solvent bath, in particular a methanol bath, and subsequently dried. Through this preferred processing step it is possible to release the solvent essentially completely from the composite material, or remove it from said composite material.

Preferably, the percentage of the coordination polymer is between 10% by weight and 80% by weight of the composite material produced, in particular between 20% by weight and 50% by weight.

Preferably, the surface of the coordination polymer is at least partially modified to be non-polar or polar. A composite material which was described above is preferably used for gas separation, vapor separation, and/or pervaporation. Furthermore, a gas separation reactor or pervaporation reactor is preferably provided with a composite material which was described above. Furthermore, a process is expediently provided for the operation of a gas separation reactor or pervaporation reactor with a corresponding composite material, where a gas pressure differential between a first side and a second side of the composite material which was described above is set up and/or a pressure-swing adsorption process is applied.

BRIEF DESCRIPTION OF THE DRAWINGS

The invention is described below, without restriction of the general concept of the invention, with the aid of embodiment examples to which reference is expressly made with regard to all the details according to the invention which are not explained in more detail in the text. Shown are:

FIG. 1 a preferred reaction schema for the modification of the surface of a coordination polymer, FIG. 2 a scanning electron microscope picture of an embodiment of a film according to the invention, FIG. 3 a scanning electron microscope picture of another embodiment of a film according to the invention, FIG. 4 a scanning electron microscope picture of another embodiment of a film according to the invention.

DETAILED DESCRIPTION

The particulars shown herein are by way of example and for purposes of illustrative discussion of the embodiment of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the present invention may be embodied in practice.

Already known for a rather long time, substance classes of porous solids are designated as metal organic frameworks or MOFs or coordination polymers. The theory of coordination compounds developed by Alfred Werner (see A. Werner, Z. Anorg. Allg. Chem. 3 (1893) 267, which is incorporated by reference herein) made it possible for the first time to understand the experimental results of the chemistry of inorganic complexes. Through the addition of organic molecules capable of forming complexes, such as, for example, diamines or diacids, to dissolved salts, stable MOFs are obtained. The distances between the lattice points given by the metal ions as coordination centers can be set over a wide range by the structure, particularly of the organic components, and yield microporous to mesoporous substances. The spacing of the functional groups of the organic components essentially predetermines the pore size while the type of metallic component(s) is decisive for any catalytic properties. MOFs or coordination polymers can thus be varied in many ways and have been documented extensively (see S. Kitagawa, et al., Angew. Chem., Int. Ed. 43 (2004) 2334, which is incorporated by reference herein).

Following from the structure of the coordination polymer the large internal volume can be utilized for sorption or condensation of gases and vapors. Additional possibilities of application follow from the metal component of the MOFs. The catalytic properties of metals or metal salts are also retained or changed during chemical conversion to MOFs. Through the easily accessible inner surface, improved catalytic properties can also arise. MOFs are as a rule temperature-resistant to >300° C. and have, depending on lattice spacing or pore size, low densities of 0.8 to 0.2 g/cm$^3$. MOFs with catalytic properties are, for example, described as catalysts for hydroformylation and hydrogenation (see Fox and Pesa, U.S. Pat. No. 4,504,684, which is incorporated by reference herein) or epoxidation (see Müller, et al. U.S. Pat. No. 6,624,318 B1, which is incorporated by referenced herein).

Since the MOFs consist of inorganic salts and organic compounds, such as, for example, diamines and diacids, compatibility with elastomeric, and also vitreous, polymers is very much greater than with pure inorganic substances such as zeolites or carbon molecular sieves. Previously, this class of compounds has not been added to polymers and their compatibility or modified properties with respect to gas permeability and selectivity have not been investigated.

MOFs have been produced, analyzed, and added to three different polymers with ranked gas permeability and gas selectivity. Depending on the density of polymer and the added solid, the weight-normed addition of 20% by weight to 30% by weight corresponds to a percentage of 20-80% by volume of the film. Since the MOFs as fillers can also be produced with very fine crystalline structure, or as very soft, crystalline materials can also be comminuted to small grain sizes down to below 1 μm, composite materials with a film thickness up to approximately 1 μm with good compatibility of MOFs with the polymer can be produced by processes known in principle.

Figure 1:
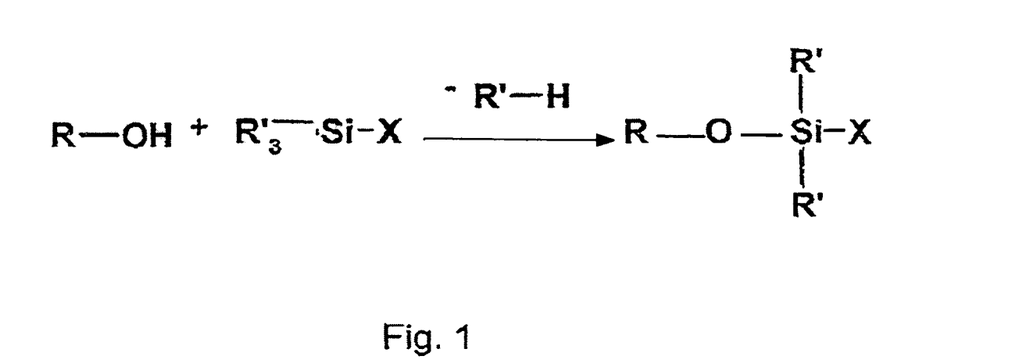

If required, a surface treatment can furthermore be carried out with known methods to improve the compatibility between the MOF (as filler) and the polymer. This has been documented in the literature (see, for example, R. N. Rothon "Particulate Fillers for Polymers" (Rapra Review Report 141), RAPRA Technology Limited, 2002, ISBN: 1 859 57310, which is incorporated by reference herein; Y. S. Lipatov "Polymer reinforcement," Toronto-Scarborough, Ontario, ChemTec Publ., 1995, ISBN: 1-89519-808-9, which is incorporated by reference herein; A. K. Kulshreshtha (Ed.) "Handbook of polymer blends and composites," Shrewsbury, RAPRA Technology Limited, 2002, ISBN: 1-8597-309-6, which is incorporated by reference herein). For this purpose, monomers or polymers can be used. Classical monomers are, for example, silanes with reactive groups which react chemically with the surface of the solid and in so doing modify terminal hydroxyl groups somewhat. Thereby the surface properties of the solid are changed long-term, for example, from polar to non-polar or from non-polar to polar. This is represented schematically in FIG. 1, in which a schematic representation of a surface modification with monomeric or polymeric reagents is shown.

Such reagents can be obtained from several manufacturers, for example, from Degussa (Sivento™ silanes) or from Sigma-Aldrich designated as ADHESION PROMOTERS. These can be, for example, methoxytrimethyl silanes, dimethoxydimethyl silanes, or trimethoxy(vinyl) silanes among others.

Flawless composites of polymers and MOFs have been produced according to the invention by the addition of MOFs to various polymers and their properties, particularly their gas separation properties, investigated.

Fine-crystalline MOFs have been produced, added to a polymer solution, and processed to form flawless films. These films have been investigated with regard to their properties, particularly their gas separation properties (cf. examples under 5).

MOFs have been produced by simplified synthesis and for the first time incorporated in films suitable for gas separation. The gas permeability has been increased by 1.5 to 3.7 times, depending on the polymer, with only slightly reduced to unreduced selectivity. In a measurement with a butane-methane gas mixture a significant increase of the gas selectivity from 10 to 16 was found with the addition of MOF.

Sharply increased gas permeability and increased gas selectivity in the mixture yield membranes which can be used more effectively. The membrane surface needed, and thus the costs, for a given separation objective are reduced. With the use of catalytically active MOFs catalytically reactive membranes are obtained.

EXAMPLE 1

Production of a Metal Organic Framework
(Zn-MOF)

Dybtsev, et al., Angew. Chem. 116 (2004) 5143-5146 describe the synthesis of a highly porous, but along with this rigid and flexible, MOFs. With $N_2$ a BET surface of 1450 m$^2$/g was found at 78K (according to the method of the determination of the specific surface of Brunauer, Emmett, and Teller). The synthesis was carried out over 2 days in a steel cylinder jacketed with Teflon at 120° C. The resulting MOF still contains dimethylformamide (in the following DMF) and water of crystallization (4 DMF·½ $H_2O$) in the internal volume.

For simplification, and in order to obtain smaller crystals, these specifications were modified according to the present invention and the synthesis carried out without pressure in a normal glass flask. In 200 ml of dry DMF 16.85 mmol of terephthalic acid were suspended and treated with 8.33 mmol of diazabicyclooctane. With stirring, 16.81 mmol of zinc nitrate hexahydrate were added, heated to 110° C., and stirred in the absence of air for one day. The fine crystals were suctioned off and then rewashed with warm DMF. The filter residue was suspended in methanol, suctioned off again, and rewashed with methanol. 4 g of fine, colorless crystals were obtained.

The thermogravimetric investigation of a dry sample was stable up to 300° C. (mass loss <1%) and lost 20% mass between 300° C. and 350° C. An additional 50% mass was lost up to 500° C. The residue of 30% remained up to 1000° C. These data show that after synthesis the DMF found as a template in the crystal can be washed out by a simple methanol treatment and that the crystals are temperature-stable up to ca. 250° C.

EXAMPLE 2

Synthesis of a Polyamidimide (in the Following PAI) as First Polymer

According to specifications in DE 42 32 496, 98.8 g of dicarboxylic acid of the structure F along with 46.46 g of diamine of the structure IV were dissolved in 840 ml of N-methylpyrrolidone. 28 g of LiCl, 224 ml of pyridine, and 73.63 g of triphenyl phosphine were added and polymerized for 3 hours at 115° C. This was followed by rapid cooling and precipitation in 20 times the amount of water. This was followed in turn by decoction with methanol and drying in a vacuum at 120° C. 138 g of colorless polymer with reduced viscosity (NMP, 0.5%) of 1.2 dl/g were obtained.

EXAMPLE 3

Synthesis of a Polyimide (in the Following PI) as First Polymer

According to specifications in U.S. Pat. No. 4,912,197, example 2, a polyimide of 4,4'-[2,2,2-trifluoro-1-(trifluoromethyl)ethylidene]bis (1,2-benzenedicarboxylic anhydride) (6FDA) and 2,3,5,6-tetramethyl-1,4-phenylene diamine was produced which showed very good film formation with a reduced viscosity of 0.70 dl/g (NMP 0.5%).

EXAMPLE 4

Production of a Metal Organic Framework in the Presence of a Polyamidimide (PAI)

In a glass flask 3 g of PAI from example 2 were dissolved in 50 ml of DMF and treated with a suspension of 1 g of zinc nitrate hexahydrate, 0.56 g of terephthalic acid, and 0.187 g of diazabicyclooctane in 40 ml of DMF. This was followed by stirring over night at 110° C. in the absence of air. Crystals with precipitated polymer were to be found at the edge of the flask. The production of the MOFs in a solution together with a PAI is only possible with difficulty and leads to the precipitation of the polymers. The composite material thus produced is suitable for a pressure-swing adsorption process.

EXAMPLE 5

Production of Films of Different Composite Materials

Films of PAI and of PI were produced in 7-10% solution of tetrahydrofuran (in the following THF) and evaporated off on a horizontal glass plate under a defined atmosphere of argon. Films of polydimethylsiloxane (in the following PDMS, Dehesive®, Wacker) were produced from ethyl acetate (in the following EE) and equal concentration and likewise evaporated off on a Teflon-coated, horizontal plate.

Films with Zn-MOF were produced from THF (PAI, PI) or EE (PDMS) as described above. However, the Zn-MOF was first stirred in a little solvent in a glass flask in an ultrasonic bath for 15 minutes. The solution of each of the polymers PAI, PI, and PDMS was added and stirred overnight. These films contained 30% by weight of Zn-MOF from example 1 and were flexible.

The films thus obtained were placed in a methanol bath overnight, first dried for 2 hours in the air, and after that dried in the vacuum-drying cabinet at 120° C. and >10 mbar in an oil-free vacuum.

EXAMPLE 6

Measurement of Gas Permeation, Diffusion Coefficient, and Sorption Coefficient with Pure Gas The films, of composite materials MOF in PAI, MOF in PI, and MOF in PDMS obtained from example 5 were measured with pure gases in a gas measurement apparatus [Al-Masri, et al., Macromolecules 32 (1999) 7853-7858]. The permeability (P) was calculated from the linear increase of the pressure over time and the film thickness (1). The diffusion coefficient ($D_a$) was calculated from the time-lag (θ) and the film thickness ($D_a=1^2/6θ$) and the sorption coefficient ($S_a$) determined by $S_a=P/D_a$.

In Table 1 the results of the measurement are summarized. The diffusion coefficient ($D_a$) is in $cm^2/s \times 10^{-8}$, the sorption coefficient ($S_a$) in $cm^3(N)/cm^3$ $cmHg \times 10^{-3}$ and the permeability (P) in Barrer.

TABLE 1

Gas data for the polymer PAI from example 2.
(Film thickness: 45 μm)

| GAS | $D_a$ | $D_a(X/N_2)$ | $S_a$ | $S_a(X/N_2)$ | P | $P(X/N_2)$ | GAS |
|---|---|---|---|---|---|---|---|
| O2 | 4.87 | 4.2 | 17.8 | 1.25 | 8.69 | 5.26 | O2 |
| N2 | 1.16 | 1.0 | 14.3 | 1.00 | 1.65 | 1.00 | N2 |
| He | 840 | 720 | 1.05 | 0.07 | 83.4 | 50.4 | He |
| H2 | 270 | 230 | 2.94 | 0.21 | 79.2 | 47.9 | H2 |
| CO2 | 1.09 | 0.93 | 430 | 30.40 | 46.7 | 28.3 | CO2 |
| CH4 | 0.17 | 0.15 | 41.7 | 2.93 | 0.94 | 0.57 | CH4 |

TABLE 2

Gas data for PAI from example 2 with 30% by weight Zn-MOF from example 1.
(Film thickness: 75 μm)

| GAS | $D_a$ | $D_a(X/N_2)$ | $S_a$ | $S_a(X/N_2)$ | P | $P(X/N_2)$ | GAS |
|---|---|---|---|---|---|---|---|
| O2 | 24.1 | 4.3 | 8.75 | 1.11 | 21.1 | 4.77 | O2 |
| N2 | 5.59 | 1.0 | 7.91 | 1.00 | 4.4 | 1.00 | N2 |
| He | 4000 | 720 | 0.49 | 0.06 | 196 | 44.3 | He |
| H2 | 1300 | 240 | 1.44 | 0.18 | 191 | 43.1 | H2 |
| CO2 | 5.78 | 1.03 | 188 | 23.80 | 109 | 24.6 | CO2 |
| CH4 | 0.86 | 0.15 | 31.2 | 3.94 | 2.7 | 0.60 | CH4 |

TABLE 3

Gas data for PI from example 3.
(Film thickness: 27 μm)

| GAS | $D_a$ | $D_a(X/N_2)$ | $S_a$ | $S_a(X/N_2)$ | P | $P(X/N_2)$ | GAS |
|---|---|---|---|---|---|---|---|
| O2 | 62.9 | 2.64 | 27.3 | 1.29 | 171.0 | 3.63 | O2 |
| N2 | 23.8 | 1.00 | 21.2 | 1.00 | 46.9 | 1.00 | N2 |
| He | 191.0 | 8.03 | 21.6 | 1.02 | 458.0 | 9.75 | He |
| H2 | 171.0 | 7.19 | 37.9 | 1.79 | 743.0 | 15.80 | H2 |
| CO2 | 23.6 | 0.99 | 425.0 | 20.08 | 1000.0 | 21.40 | CO2 |
| CH4 | 4.1 | 0.17 | 107.0 | 5.04 | 43.4 | 0.92 | CH4 |

TABLE 4

Gas data for PI (example 3) with 30% by weight Zn-MOF (example 1).
(Film thickness: 91 μm)

| GAS | $D_a$ | $D_a(X/N_2)$ | $S_a$ | $S_a(X/N_2)$ | P | $P(X/N_2)$ | GAS |
|---|---|---|---|---|---|---|---|
| O2 | 340 | 2.85 | 15.5 | 1.06 | 526 | 3.02 | O2 |
| N2 | 120 | 1.00 | 14.6 | 1.00 | 174 | 1.00 | N2 |
| He | 6900 | 57.80 | 1.6 | 0.11 | 1100 | 6.31 | He |

TABLE 4-continued

Gas data for PI (example 3) with 30% by weight Zn-MOF (example 1).
(Film thickness: 91 μm)

| GAS | $D_a$ | $D_a(X/N_2)$ | $S_a$ | $S_a(X/N_2)$ | P | $P(X/N_2)$ | GAS |
|---|---|---|---|---|---|---|---|
| H2  | 6000 | 50.10 | 3.2   | 0.22  | 1890 | 10.80 | H2  |
| CO2 | 75   | 0.63  | 440.0 | 30.17 | 3330 | 19.10 | CO2 |
| CH4 | 35   | 0.30  | 47.9  | 3.27  | 170  | 0.98  | CH4 |
| Xe  | 2.31 | 0.02  | 310.0 | 21.40 | 72   | 0.41  | Xe  |

TABLE 5

Gas data for PDMS according to example 5.
(Film thickness: 600 μm)

| GAS | $D_a$ | $D_a(X/N_2)$ | $S_a$ | $S_a(X/N_2)$ | P | $P(X/N_2)$ | GAS |
|---|---|---|---|---|---|---|---|
| O2  | 1930 | 1.26 | 3.01  | 1.71 | 580  | 2.16  | O2  |
| N2  | 1530 | 1.00 | 1.76  | 1.00 | 269  | 1.00  | N2  |
| He  | 8980 | 5.87 | 0.43  | 0.25 | 389  | 1.45  | He  |
| H2  | 6830 | 4.46 | 0.99  | 0.56 | 673  | 2.50  | H2  |
| CO2 | 1620 | 1.06 | 17.50 | 9.94 | 2830 | 10.50 | CO2 |
| CH4 | 1330 | 0.87 | 6.29  | 3.58 | 837  | 3.11  | CH4 |

TABLE 6

Gas data for PDMS according to example 5 with
30% by weight Zn-MOF (example 1).
(Film thickness: 440 μm)

| GAS | $D_a$ | $D_a(X/N_2)$ | $S_a$ | $S_a(X/N_2)$ | P | $P(X/N_2)$ | GAS |
|---|---|---|---|---|---|---|---|
| O2  | 1070 | 1.57 | 7.43  | 1.26  | 793  | 1.98 | O2  |
| N2  | 680  | 1.00 | 5.90  | 1.00  | 401  | 1.00 | N2  |
| He  | 4700 | 6.86 | 1.12  | 0.19  | 521  | 1.30 | He  |
| H2  | 4030 | 5.92 | 2.37  | 0.40  | 955  | 2.38 | H2  |
| CO2 | 515  | 0.76 | 77.80 | 13.20 | 4010 | 9.98 | CO2 |
| CH4 | 635  | 0.94 | 18.70 | 3.17  | 1190 | 2.96 | CH4 |

EXAMPLE 7

Measurement of Permeability and Selectivity in the Gas Mixture n-Butane/Methane

A PDMS film with 30% by weight Zn-MOF from example 1 was produced according to example 5 with a thickness of 200 μm. With a gas mixture consisting of 98% by volume methane and 2% by volume n-butane the gas permeability and selectivity were measured at 30° C. and a feed pressure of 1.05 bar using a gas-chromatographic method. The n-butane permeability was found to be 8400 Barrer with a selectivity P(butane/CH4) of 16.2. From the literature only a selectivity of 10.3 was found for a PDMS film of comparable thickness [Pinnau et al., J. Membrane Sci. 244 (2004) 227-233].

EXAMPLE 8

Modification of Zn-MOF on the Surface

One gram of the Zn-MOF produced in example 1 was suspended in 200 ml of 2-propanol with the aid of ultrasound. 0.1 g of a 50% solution of a trimethoxysilylpropyl-modified polyethylene imine (ABCR) was added and stirred for 1 hour at room temperature. This was followed by refluxing for another 2 hours. After stirring overnight this was followed by drawing off on the rotary evaporator to form a residue and drying in a vacuum-drying cabinet at 105° C. over night at >20 mbar. 1.05 g of a slightly yellowish powder were obtained.

EXAMPLE 9

Film From Modified Zn-MOF and PI and Gas Separation Values

As in example 5 a film of PI (according to example 3) was produced. A 180-μm-thick film was produced.

TABLE 7

Gas data determined according to example 6
for film from example 9 with 30% by
weight modified Zn-MOF (example 8).
(Film thickness: 180 μm)

| GAS | $D_a$ | $D_a(X/N_2)$ | $S_a$ | $S_a(X/N_2)$ | P | $P(X/N_2)$ | GAS |
|---|---|---|---|---|---|---|---|
| O2  | 350  | 2.21  | 24   | 1.12  | 851  | 2.49  | O2  |
| N2  | 159  | 1.00  | 21   | 1.00  | 342  | 1.00  | N2  |
| He  | 7800 | 49.23 | 1.58 | 0.07  | 1240 | 3.61  | He  |
| H2  | 200  | 32.73 | 4.49 | 0.21  | 2330 | 6.79  | H2  |
| CO2 | 83.0 | 0.52  | 625  | 28.88 | 5200 | 15.15 | CO2 |
| CH4 | 53.3 | 0.34  | 75.9 | 3.51  | 404  | 1.18  | CH4 |

Figure 2:
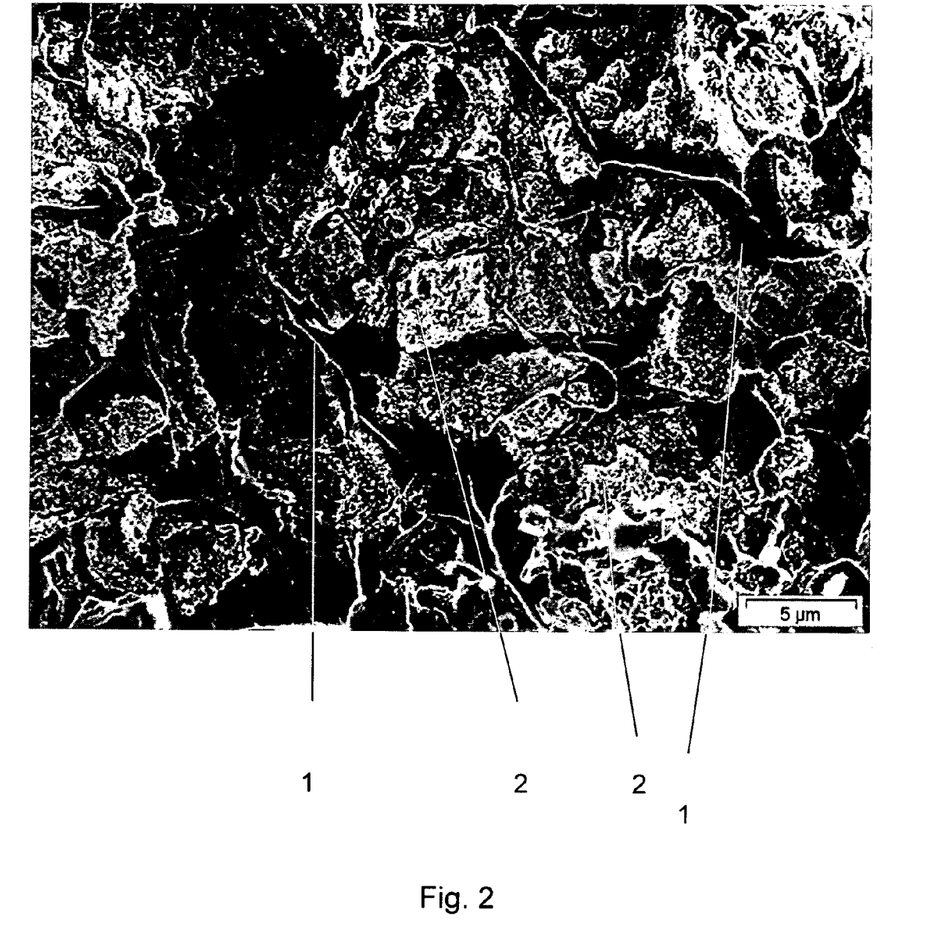

FIG. 2 shows a scanning electron microscope picture of a fold of a film with 30% by weight modified Zn-MOF from example 5 with a first polymer PAI (polyamidimide) in a 3000-fold enlargement. The scale for this scanning electron microscope picture is represented in the right lower corner. The polymer membrane 1 in the form of the polyamidimide PAI as well as the coordination polymer 2 in the form of the Zn-MOF can be seen very well. The porosity of the coordination polymer 2 can also be seen very well. This is present in corresponding large clusters with an extension of ca. 1 to 5 μm and is embedded in a matrix of polyamidimide or of the membrane polymer 1.

Figure 3:
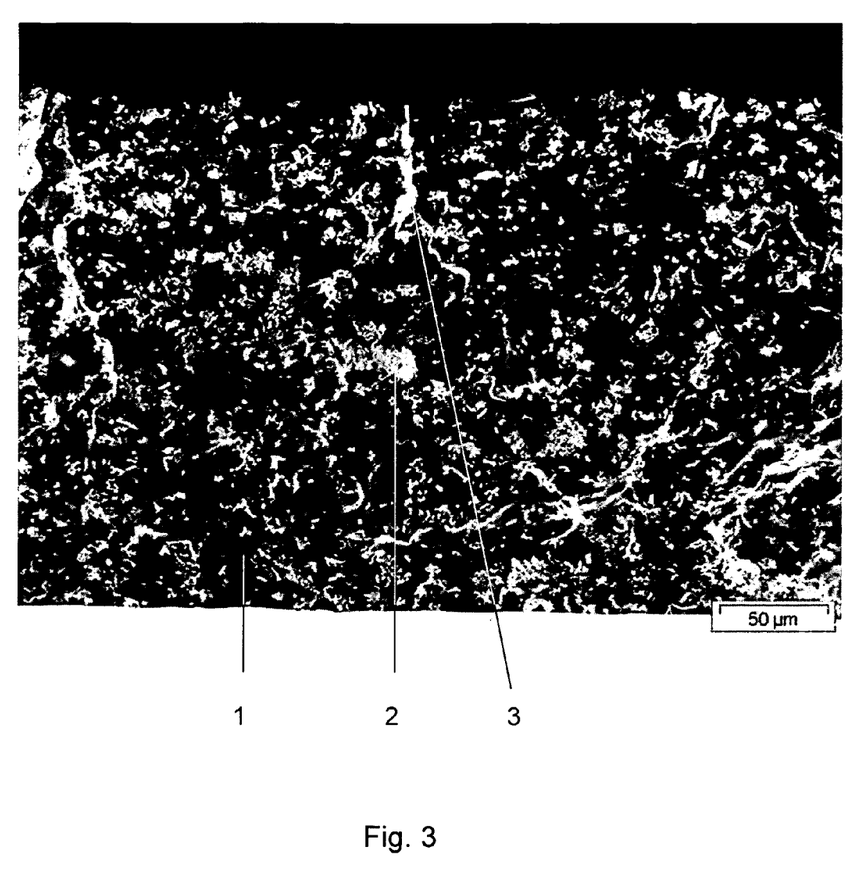

FIG. 3 shows a corresponding additional scanning electron microscope picture of a film according to the invention with 30% by weight Zn-MOF from example 5 with a membrane polymer 1 of polydimethylsiloxan in a 300-fold enlargement. Furthermore, tears 3 can be seen which arise due to the preparation of the fold of the film for the scanning electron microscope picture.

Figure 4:
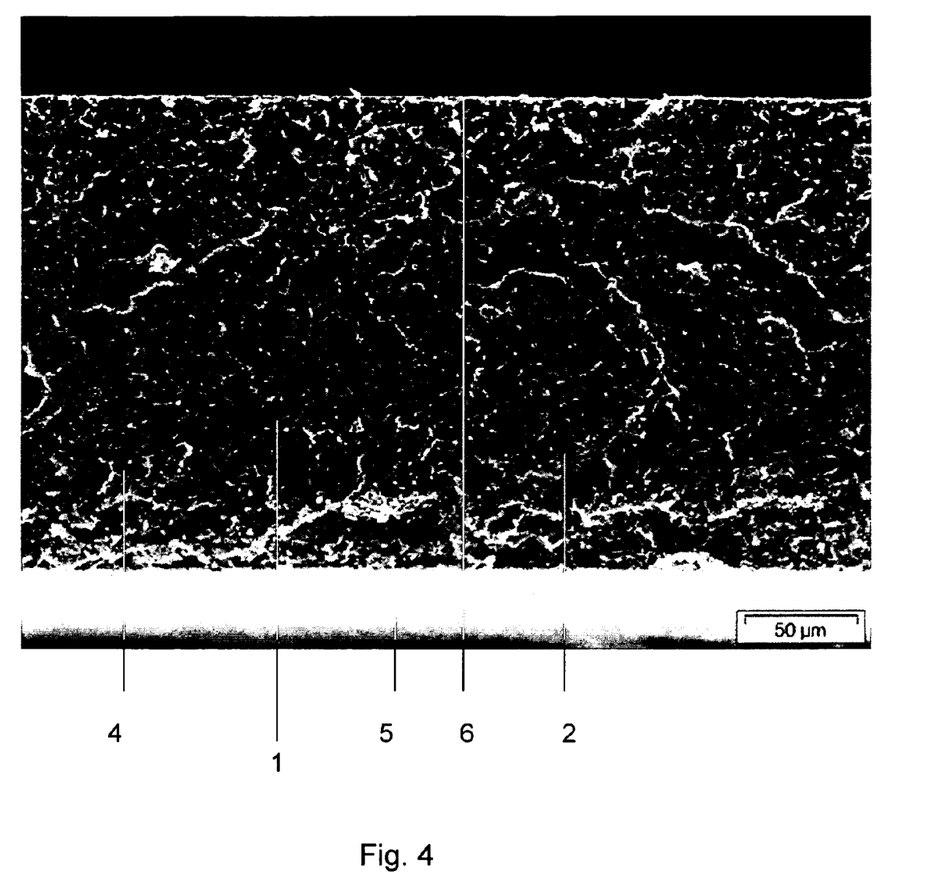

FIG. 4 shows a scanning electron microscope picture of a film according to the invention with 30% by weight Zn-MOF with a membrane polymer 1 of polyimide in a 300-fold enlargement. In this scanning electron microscope image the lower side 5 and the upper side 6 can be seen well and furthermore cavities 4 which arise due to the fact that during the production of the fold, which is shown in the scanning electron microscope picture according to FIG. 4, the MOF clusters break out.

The fragments for the scanning electron microscope picture according to FIGS. 2 to 4 were broken in liquid nitrogen and the fold provided with a gold/palladium alloy in a magnetron sputtering system in order to make possible a good scanning electron microscope picture.

It is noted that the foregoing examples have been provided merely for the purpose of explanation and are in no way to be construed as limiting of the present invention. While the present invention has been described with reference to an exemplary embodiment, it is understood that the words which have been used are words of description and illustration, rather than words of limitation. Changes may be made, within the purview of the appended claims, as presently stated and as amended, without departing from the scope and spirit of the invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS 1 membrane polymer
2 coordination polymer
3 tear
4 cavity
5 lower side
6 upper side

The invention claimed is:

1. A composite material comprising at least one polymer and a second polymer, wherein:
   the second polymer is a coordination polymer;
   the coordination polymer is a metal organic framework (MOF) with permanent porosity; and
   the coordination polymer is in crystal form.

2. The composite material according to claim 1, wherein the composite material is a composite membrane.

3. The composite material according to claim 1, wherein the composite material is configured as a composite membrane for gas separation, vapor separation, or pervaporation.

4. The composite material according to claim 1, wherein the coordination polymer is in the form of a crystal cluster.

5. The composite material according to claim 1, wherein the coordination polymer is catalytically active.

6. The composite material according to claim 1, wherein crystal size is in the range from 0.1 .mu.m to 10 .mu.m.

7. The composite material according to claim 1, wherein crystal size is in the range from 0.4 .mu.m to 1 .mu.m.

8. The composite material according to claim 1, wherein the first polymer is formed as a polymer matrix.

9. The composite material according to claim 1, wherein the first polymer is a material from which a dense membrane can be produced.

10. The composite material according to claim 1, wherein the coordination polymer has an elementary cell size in the range of 0.5 to 1 nm.

11. The composite material according to claim 1, wherein the surface of the coordination polymer is modified to be at least partly non-polar.

12. The composite material according to claim 1, wherein a gas selectivity of more than 13 is provided as the ratio of n-butane to methane.

13. The composite material according to claim 1, wherein a gas selectivity of more than 16 is provided as the ratio of n-butane to methane.

14. The composite material according to claim 1, wherein the coordination polymer has an elementary cell size in the range of 0.3 to 10 nm.

15. The composite material according to claim 14, further comprising an intercalate introduced into the elementary cells of the coordination polymer.

16. A composite membrane comprising a thin layer of a composite material according to claim 1 applied on a porous base.

17. The composite membrane according to claim 16, wherein a thickness of the layer is in a range of 0.3 .mu.m to 2 .mu.m.

18. The composite membrane according to claim 16, wherein a thickness of the layer is in a range of 0.5 .mu.m to 1 .mu.m.

19. A gas separation reactor or pervaporation reactor with a composite material, the composite material comprising at least one polymer and a second polymer, wherein:
   the second polymer is a coordination polymer;
   the coordination polymer is a metal organic framework (MOF) with permanent porosity; and
   the coordination polymer is in crystal form.

* * * * *